July 11, 1950     L. M. PUSTER     2,514,514
FLUID CONTROLLING VALVE
Filed March 4, 1946
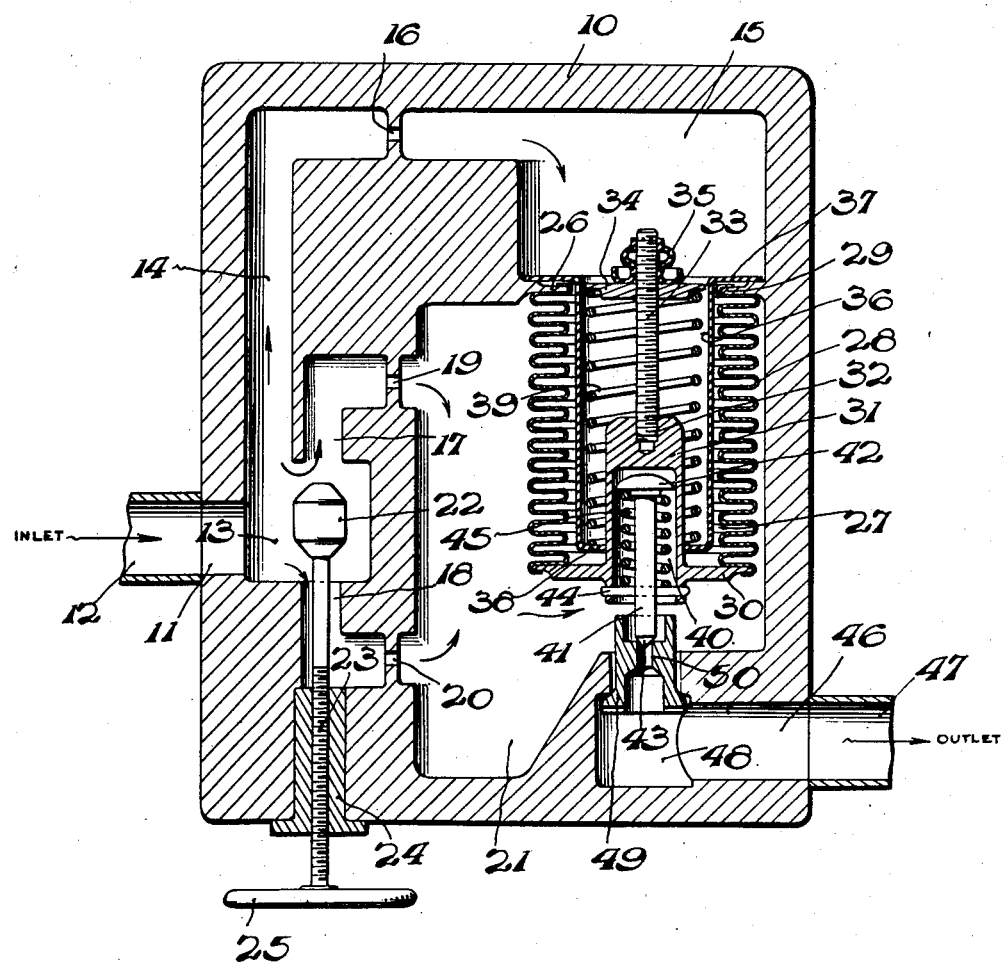
Inventor
*Louis M. Puster*
By *Cameron, Kerkam + Sutton*
attorneys Patented July 11, 1950

2,514,514

UNITED STATES PATENT OFFICE 2,514,514

FLUID CONTROLLING VALVE

Louis M. Puster, Knoxville, Tenn., assignor to Robertshaw-Fulton Controls Company, a corporation of Delaware Application March 4, 1946, Serial No. 651,767

7 Claims. (Cl. 137—152.5)

This invention relates to automatically actuated flow control valves, and more particularly to automatically actuated valves for maintaining a constant rate of flow of fluid through a closed system.

By way of illustration but not of limitation the present invention possesses particular utility in controlling the flow of a refrigerant in a cold room for the purpose of testing heating controls where a constant cooling effect is required without employing the usual method of having a smaller test room within a large cold room to obtain a constant cooling rate. In the ordinary refrigerating system the controls are designed to maintain a constant temperature inside the cold room. This condition is not satisfactory to use for test purposes as a constant rate of heat flow out of the cold room is necessary in order that the instrument under test shall control the amount of heat put into the cold room. The present invention provides a valve whereby the refrigerant is made to take heat from the cold room at a constant rate and thus enable the instrument being tested to control the rate of input of heat. But while the present invention possesses particular utility in providing a means for maintaining a constant rate of heat flow out of the cold room or other space of a refrigerating system, it is to be expressly understood that the present invention is not restricted to use in refrigerating systems but can be applied to any suitable type of fluid control where constant rate of flow is desired.

It is an object of this invention to provide a device of this type characterized which is highly sensitive to fluctuations in either or both of the pressure of the inflowing fluid or of the outflowing fluid.

Another object of this invention is to provide a device of the type characterized which is not responsive to sudden surges of pressure.

Another object of this invention is to provide a device of the type characterized which can be readily set to maintain a plurality of rates of flow of the fluid under control.

Another object of this invention is to provide a device of the type characterized which can be constructed as a compact unit that may be readily installed wherever it is desired to maintain a constant rate of flow.

Another object of this invention is to provide a device of the type characterized which is simple in construction, certain in action and efficient in operation.

Other objects will appear as the description of the invention proceeds.

The invention is capable of receiving a variety of mechanical expressions only one of which is illustrated on the accompanying drawing, and therefore it is to be expressly understood that the drawing is for purposes of illustration only, and is not to be construed as a definition of the limits of the invention, reference being had to the appended claims for that purpose.

Referring in detail to the accompanying drawing which illustrates schematically in section a construction embodying the present invention, 10 designates any suitable housing which may be of any suitable size, construction and material. Housing 10 has a suitable inlet aperture 11 with which is associated in any suitable way an inlet pipe 12 communicating with the source of fluid to be controlled, as for example the condenser of a refrigerating system. Inlet aperture 11 communicates with a chamber 13 from which leads a passage 14 to a pressure chamber 15. Preferably interposed in the passage 14 is an orifice 16, which if desired may be provided in a separate member suitably mounted in said passage, said orifice being provided to prevent any sudden surge of pressure in chamber 13 from being transmitted to pressure chamber 15. Otherwise, the supply pressure in chamber 13 is transmitted through passage 14 to the fluid in chamber 15, the passage 14 constituting a mere pressure transmitting passage without flow therethrough except such as may be required to maintain the pressure in chamber 15 equal to the pressure in the chamber 13.

Chamber 13 has a pair of outlets 17 and 18, each of which communicates with a metering orifice, 19 and 20 respectively, leading to a control chamber 21. Orifices 19 and 20 are of different sizes and the sizes are appropriately selected so as to effect predetermined rates of flow into the chamber 21 depending upon whether one or the other or both of said orifices are in operation. To determine whether either or both of said orifices shall be in operation a valve member 22 is mounted in the chamber 13 on a threaded shank 23 which extends through a threaded bushing 24 to a position exteriorly of the housing 10 where it is provided with a suitable hand wheel 25 or other member for manipulating said valve member 22. By threading the valve stem 23 in one direction or the other said member may be seated against the entrance to outlet 17 to prevent flow through orifice 19, or seated against the entrance to outlet 18 to prevent flow through the orifice 20, or left in an intermediate position as shown in the drawing so that flow of fluid will occur through both orifices 19 and 20. Thereby three different rates of flow may be established. While only three rates of flow are illustrated, it will be apparent that if desired the construction may be extended so as to provide additional orifices and appropriate valve means for determining which shall be active. As with the case of orifice 16, orifices 19 and 20 may if preferred be provided in separate members suitably mounted in the outlet passages 17 and 18.

Intermediate the chambers 15 and 21 is a partition 26 to which is hermetically sealed an expansible and collapsible chamber 27 here shown as having its peripheral wall composed of a tubular corrugated expansible and collapsible wall or bellows 28 with one end suitably sealed in an aperture 29 in partition 26 and its opposite end suitably sealed to a movable end wall 30. Movable end wall 30 has suitably attached thereto or formed thereon a reentrantly directed socket portion 31 provided with an interiorly threaded recess 32 in its end wall. Mounted in said recess 32 is a threaded stem 33 which carries a spring plate 34 operable by a nut 35 separate from or formed as a unit with said plate 34 and threaded onto the stem 33. A suitably perforated cup-shaped member 36 has an exteriorly projecting flange 37 by which it is mounted on or attached to partition 26, and said member 36 projects interiorly of the chamber 27 and has its inner end 38 apertured to receive the socket portion 31 which has relative sliding movement with respect to said inner end 38 of member 36. In between the spring plate 34 and the inner extremity 38 of said member 36 is interposed a coil spring 39 which reacts on said spring plate 34 to urge the same in an upward direction as viewed in the drawing, and as said spring plate is held against or formed unitarily with the nut 35 on the threaded stem 33 and the latter is attached to the socket section 31 on the movable end wall 30 of the expansible and collapsible chamber 27, it will be observed that the spring tends to collapse said chamber 27 moving the movable end wall 30 upwardly as viewed in the drawing.

Mounted within the socket 40 of said socket section 31 is a valve plunger 41 having a head 42 at its inner end and its opposite extremity constituting a valve member 43. A pin 44 is passed loosely through an aperture in said valve plunger and secured in position in an extension on the movable end wall 30. Interposed between said pin 44 and the head 42 of said valve plunger is a coil spring 45. In place of the pin 44 any other suitable means may be provided to provide a fixed abutment for the spring 45 but permitting lateral movement of the plunger 41 sufficiently to align itself with its valve seat.

Housing 10 is further provided with an outlet aperture 46 with which it is associated in any suitable way an outlet conduit 47 which, in case of a refrigerating system, may lead to the evaporator. Outlet aperture 46 communicates with a back pressure chamber 48 from which an aperture leads to the chamber 21, and mounted in said aperture in any suitable way is a valve seat member 49 provided with a port 50 in alignment with the valve plunger 41. Owing to the spring mounting of the valve plunger 41 in the socket 40 the end 43 constituting the valve member may readily align itself with the valve port 50 and effect a certain closure thereof when the movable end wall 30 is moved downwardly as viewed in the drawing, carrying the plunger 41 therewith in unitary relationship therewith except for the lateral movement permitted to effect alignment with the port 50.

From the foregoing description it will be apparent that valve member 43 is urged toward its closed position by the supply pressure in the chamber 13 acting through the pressure chamber 15 and interiorly of the expansible and collapsible chamber 27 on the inner face of the movable end wall 30, free access of the pressure fluid to the interior of said chamber 27 being provided by reason of perforations in the member 36. Opposing said supply pressure are first, the pressure in the chamber 21 acting on the outer face of said movable end wall 30, second, the back pressure in the chamber 48 acting through valve port 50 on the end 43 of the valve plunger 41, and third, the tension of the spring 39 which may be predetermined by adjustment of the nut 35.

Considering by way of example the operation of this invention as applied to the control of the refrigerant in a refrigerating system, and assuming that the temperature of the incoming refrigerant is held constant by a suitable thermostatic control, the supply pressure in the chamber 13 must obviously be greater than the back pressure in the back pressure chamber 48 in order that there shall be any flow through the valve. Depending upon whether either or both of the apertures 19 and 20 are effective, the refrigerant may flow into the control chamber 21 where there will be a drop in pressure as compared with the supply pressure depending upon the size of the aperture or apertures through which the refrigerant may flow from chamber 13 to chamber 21. Remembering that the supply pressure is applied interiorly to the movable end wall 30, it will be apparent that equilibrium exists when the supply pressure times the mean effective area at the end of chamber 27, which value may be written S, equals the pressure in the control chamber times the mean effective area at the end of chamber 27, which value may be written C, plus the back pressure times the effective area of valve member 43, which value may be written B, plus the extension of spring 39. So constructed the device will compensate for any variations in the supply pressure S or the back pressure B or both.

Assuming first that the back pressure remains constant, requiring a constant rate of flow through the system. A constant differential pressure will accordingly exist across such of the orifices 19 and 20 as are in operation, and valve plunger 41 will assume such a position, that S minus C is equal to B plus the tension of spring 29, both of which are constants by the assumption, so that a constant rate of flow of the refrigerant is maintained. If now there is an increase in the supply pressure the value S minus C increases, and the value of C should correspondingly increase so that the differential will equal B plus the tension of the spring. As the greater pressure S, under the assumption, is acting on the inner face of the movable end wall 30 the valve plunger 41 is moved toward closed position so as to throttle the flow from the chamber 21 and thereby build up C until the value S minus C again equals the constant value represented by the sum of B and the spring tension. If, on the other hand, the supply pressure decreases, the value S minus C decreases, and as the interior pressure on the movable end wall 30 under the assumption is now less, the pressure in the control chamber 21 acting on the outer face of the movable end wall 30 causes the latter to be raised as viewed in the drawing and the valve plunger 41 is raised to increase the outflow from the chamber 21 and reestablish a differential equal to the assumed constant value of B plus the spring tension.

On the other hand, assuming that the supply pressure is constant, the heat absorbed by the liquid as it travels through the evaporator coil will be determined by the increase in the total heat of the vapor leaving the evaporator coil. The heat absorbed per pound of liquid will then be shown by the pressure and temperature of the vapor leaving the evaporator. Since the heat due to super-heat is small in proportion to the heat of vaporization, and since the exit temperature under a given test condition will be substantially constant, the variation of heat absorbed per pound will be approximately a direct function of the evaporator pressure, and such can be assumed due to the practical limitations of suction pressure variants with respect to compressor design and driving power. Assuming a constant supply pressure, the value S minus C will depend upon the orifice area predetermining the differential between the supply pressure and the pressure in the control chamber 21. As the rate of refrigerant flow required for a given rate of heat flow may be considered a straight line function of the back pressure, when the back pressure increases the demand for refrigerant increases and therefore the control chamber pressure must decrease in order to increase the differential between the constant value S and the value C. But when the back pressure increases the control chamber pressure necessary to hold the plunger valve 41 in open position decreases as apparent from the equation of equilibrium. The decrease in C increases the differential S minus C so that a greater flow of refrigerant ensues until equilibrium is reestablished. Conversely, if the back pressure decreases there is a less demand for refrigerant and the control chamber pressure increases to decrease the differential until equilibrium is reestablished. Therefore, as the back pressure changes the control chamber pressure must change inversely in such a proportion as to change the rate of refrigerant flow to meet the demand. A large change in back pressure causes only a small inverse change in the control chamber pressure, because the back pressure is acting on only the small area of the end 43 of the plunger 41 whereas the control chamber pressure is acting on the relatively large mean effective area provided at the end of the expansible and collapsible chamber. This ratio of valve area to the mean effective area of the expansible and collapsible chamber is so selected that the desired inverse change is effected in the control chamber pressure so as to maintain the proper rate of refrigerant flow.

If both S and B vary the action will be a composite of the two actions just described but equilibrium will be established when S minus C is equal to B plus spring tension, and hence the valve will operate to obtain the desired flow when S minus C minus B is equal to the fixed though adjustable value of the spring tension.

It will therefore be perceived that by the present invention means have been provided for maintaining a constant rate of flow of a fluid through a closed system that is sensitively responsive to fluctuations in either the supply or the outlet pressure. By predetermining the orifice area between the chambers 13 and 21 the rate of flow therebetween may also be accurately predetermined. At the same time injury to the expansible and collapsible chamber due to sudden surges of pressure in the chamber 13 is prevented by reason of the orifice 16. By properly providing different sized orifices between the chambers 13 and 21 under valve control the device may be as flexible as desired to obtain the desired range in rates of flow. The device is relatively compact and simple and easily adjusted, while once set it will efficiently and with certainty maintain either constant back pressure or constant supply pressure as desired.

While the embodiment of the invention illustrated on the drawing has been described with considerable particularity it is to be expressly understood that the invention is not restricted thereto as the same is capable of receiving a variety of mechanical expressions some of which will readily suggest themselves to those skilled in the art. While the invention has been explained with reference to its use in a refrigerating system it is to be expressly understood that the application of the invention is not limited thereto as the same possesses wide utility where it is desired to maintain a constant rate of fluid flow. While an expansible and collapsible chamber of the bellows type is preferred, other forms of such chamber may be used as will now be apparent to those skilled in the art, under certain conditions the spring might be omitted, and changes may also be made in the details, of construction, arrangement, proportion of parts, etc., and elements shown by way of illustration may be replaced by equivalent elements, without departing from the spirit of this invention. Reference is therefore to be had to the appended claims for a definition of said invention.

What is claimed is:

1. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween and including at least one orifice of predetermined area, means of communication between said control chamber and said back pressure chamber including a valve port, a valve member operatively associated with said pressure responsive member and cooperating with said port, said valve member having a predetermined area effective through said port to receive and transmit the pressure in said back pressure chamber to said pressure responsive member in opposition to the pressure in said inlet chamber, and resilient means also cooperating with said pressure responsive member to bias the same in opposition to the pressure in said inlet chamber.

2. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween, means of communication between said control chamber and said back pressure chamber including a valve port, a valve member operatively associated with said pressure responsive member and cooperating with said port, said valve member having a predetermined area effective through said port to receive and transmit the pressure in said back pressure chamber to said pressure responsive member in opposition to the pressure in said inlet chamber, and resilient means also cooperating with said pressure responsive member to bias the same in opposition to the pressure in said inlet chamber, said first named means of communication including a plurality of orifices of different predetermined areas and means for predetermining which of said orifices shall determine the pressure drop between said inlet chamber and said control chamber.

3. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween and including at least one orifice of predetermined area, means of communication between said control chamber and said back pressure chamber including a valve port, a valve member operatively associated with said pressure responsive member and cooperating with said port, said valve member having a predetermined area effective through said port to receive and transmit the pressure in said back pressure chamber to said pressure responsive member in opposition to the pressure in said inlet chamber, resilient means also cooperating with said pressure responsive member to bias the same in opposition to the pressure in said inlet chamber, and means interposed between said inlet chamber and said pressure responsive member to prevent surges of pressure in said inlet chamber from being transmitted to said pressure responsive member.

4. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween and including at least one orifice of predetermined area, means of communication between said control chamber and said back pressure chamber including a valve port, a valve member operatively associated with said pressure responsive member and cooperating with said port, said valve member having a predetermined area effective through said port to receive and transmit the pressure in said back pressure chamber to said pressure responsive member in opposition to the pressure in said inlet chamber, and resilient means also cooperating with said pressure responsive member to bias the same in opposition to the pressure in said inlet chamber, the area of said valve member subjected to the back pressure bearing a predetermined ratio to the effective area of said pressure responsive member.

5. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween and including at least one orifice of predetermined area, means of communication between said control chamber and said back pressure chamber including a valve port, a valve member operatively associated with said pressure responsive member and cooperating with said port, said valve member having a predetermined area effective through said port to receive and transmit the pressure in said back pressure chamber to said pressure responsive member in opposition to the pressure in said inlet chamber, and resilient means also cooperating with said pressure responsive member to bias the same in opposition to the pressure in said inlet chamber, said valve member and said pressure responsive member having cooperating parts providing for relatively lateral movement of said valve member in effecting alignment of said valve member with said port.

6. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween and including at least one orifice of predetermined area, means of communication between said control chamber and said back pressure chamber including a valve port, a valve member operatively connected to said pressure responsive member and cooperating with said port, said valve member having a predetermined area effective through said port to receive and transmit the pressure in said back pressure chamber to said pressure responsive member in opposition to the pressure in said inlet chamber, resilient means also cooperating with said pressure responsive member to bias the same in opposition to the pressure in said inlet chamber, and means cooperating with said resilient means for varying the tension applied thereby to said pressure responsive member.

7. In a device for maintaining a constant rate of fluid flow notwithstanding variations of inlet pressure or of back pressure or of both, the combination of a casing provided with an inlet chamber, an intermediate control chamber and an outlet back pressure chamber, a pressure responsive member subjected at one face to the pressure in said inlet chamber and at its opposite face to the pressure in said control chamber, means of communication between said inlet chamber and said control chamber to predetermine the pressure drop therebetween and including at least one orifice of predetermined area, means of communication between said control chamber and said back pressure chamber including a valve port, a valve member operatively associated with said pressure responsive member and cooperating with said port, said valve member having a predetermined area effective through said port to receive and transmit the pressure in said back pressure chamber to said pressure responsive member in opposition to the pressure in said inlet chamber, and resilient means also cooperating with said pressure responsive member to bias the same in opposition to the pressure in said inlet chamber, said pressure responsive member including an expansible and collapsible corrugated wall housing said resilient means.

LOUIS M. PUSTER.

REFERENCES CITED

The following references are of record in the file of this patent:

UNITED STATES PATENTS

| Number | Name | Date |
| --- | --- | --- |
| 1,923,595 | Temple | Aug. 22, 1933 |
| 2,157,707 | Keel | May 9, 1939 |
| 2,245,454 | Baker | June 10, 1941 |
| 2,297,678 | Allen | Oct. 6, 1942 |